(12) United States Patent
Jain et al.

(10) Patent No.: US 10,716,044 B2
(45) Date of Patent: Jul. 14, 2020

(54) CELL RESELECTION PROCEDURE FOR FREQUENCIES WITHOUT CELL-DEFINING SYNCHRONIZATION SIGNAL BLOCKS

(71) Applicant: QUALCOMM Incorporated, San Diego, CA (US)

(72) Inventors: Chhavi Jain, San Diego, CA (US); Arvind Vardarajan Santhanam, San Diego, CA (US); Thawatt Gopal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/196,966

(22) Filed: Nov. 20, 2018

(65) Prior Publication Data

US 2020/0162981 A1     May 21, 2020

(51) Int. Cl.
| | |
|---|---|
| *H04L 7/00* | (2006.01) |
| *H04W 36/08* | (2009.01) |
| *H04W 36/38* | (2009.01) |
| *H04W 36/00* | (2009.01) |
| *H04W 88/04* | (2009.01) |
| *H04W 36/30* | (2009.01) |
| *H04B 7/0413* | (2017.01) |

(52) U.S. Cl.
CPC ....... *H04W 36/08* (2013.01); *H04W 36/0085* (2018.08); *H04W 36/30* (2013.01); *H04W 36/38* (2013.01); *H04W 88/04* (2013.01); *H04B 7/0413* (2013.01)

(58) Field of Classification Search
CPC ..... H04W 36/02; H04W 36/24; H04W 36/34; H04W 36/36

USPC .......... 370/310, 328, 329, 331, 332
See application file for complete search history.

(56) References Cited

U.S. PATENT DOCUMENTS

| | | | |
|---|---|---|---|
| 2019/0053239 A1* | 2/2019 | Zhou | H04W 48/12 |
| 2019/0068348 A1* | 2/2019 | Nam | H04L 5/0053 |
| 2019/0098590 A1* | 3/2019 | Nam | H04W 24/08 |
| 2019/0110244 A1* | 4/2019 | Shih | H04W 76/27 |
| 2019/0124609 A1* | 4/2019 | Gheorghiu | H04W 56/00 |
| 2019/0208479 A1* | 7/2019 | Kim | H04L 5/0053 |
| 2019/0261320 A1* | 8/2019 | Yu | H04W 76/27 |
| 2019/0350003 A1* | 11/2019 | Jang | H04L 1/0005 |

(Continued)

FOREIGN PATENT DOCUMENTS

WO     2018128427 A1     7/2018

OTHER PUBLICATIONS

3GPP TS 36.304 , UE procedures in idle mode (Release 13), V13.7.0 (Sep. 2017).*

(Continued)

*Primary Examiner* — Dmitry Levitan
(74) *Attorney, Agent, or Firm* — Harrity & Harrity, LLP (57) ABSTRACT

Various aspects of the present disclosure generally relate to wireless communication. In some aspects, a user equipment (UE) may receive a master information block (MIB) that includes an indication that there is no cell-defining synchronization signal block (SSB) on a frequency on which the UE is camped; and deprioritize a reselection procedure for one or more cells on the frequency based at least in part on the indication that there is no cell-defining SSB on the frequency. Numerous other aspects are provided.

30 Claims, 7 Drawing Sheets

(56) References Cited

U.S. PATENT DOCUMENTS

2019/0350018 A1* 11/2019 Moosavi .............. H04W 76/15

OTHER PUBLICATIONS

3GPP TS 38.331, RRC protocol specification (Release 15), V15.1.0 (Mar. 2018).*
3GPP TSG-RAN, R2-1807626, Vivo, May 2018.*
3GPP TSG-RAN, R2-1805707, Nokia, Apr. 2018.*
Catt: "Remaining Issues on NR PBCH", 3GPP TSG RAN WG1 Meeting #92, 3GPP Draft: R1-1801708 PBCH, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018, Feb. 17, 2018 (Feb. 17, 2018), 6 Pages.
International Search Report and Written Opinion—PCT/US2019/062388—ISA/EPO—dated Feb. 11, 2020.
Lenovo et al., "BWP Impact on Idle/Inactive State", 3GPP TSG-RAN WG2 Meeting NR AH 1801, 3GPP Draft; R2-1800779 BWP Impact on Idle and Inactive State, 3rd Generation Partnership Project (3GPP), Mobile Competence Centre; 650, Route Des Lucioles; F-06921 Sophia-Antipolis Cedex; France, vol. RAN WG2, No. Vancouver, Canada; Jan. 22, 2018-Jan. 26, 2018, Jan. 11, 2018 (Jan. 11, 2018), pp. 1-2.
Mediatek Inc: "I P to 38.300 on Cell-Defining SSB", 3GPP TSG RAN WG2 Meeting #101bis, 3GPP Draft; R2-1804610, 3rd Generation Partnership Project (3GPP), Mobile Competence Centre; 650, Route Des Lucioles; F-06921 Sophia-Antipolis Cedex; France, vol. RAN WG2, No. Sanya, China; Apr. 16, 2018-Apr. 20, 2018, Apr. 14, 2018 (Apr. 14, 2018), 4 Pages.
VIVO: "Idle Mode Measurement and Camping", 3GPP TSG-RAN WG2 Meeting #Ad-Hoc1801, 3GPP Draft; R2-1800882 Idle Mode Measurement and Camping, 3rd Generation Partnership Project (3GPP), Mobile Competence Centre; 650, Route Des Lucioles; F-06921 Sophia-Antipolis Cedex; France, vol. RAN WG2, No. Vancouver, Canada; Jan. 22, 2018-Jan. 26, 2018, Jan. 12, 2018 (Jan. 12, 2018), 6 Pages.
VIVO: "No SIB1 Content for ANR CGI Reporting", 3GPP TSG-RAN WG2 Meeting #103, 3GPP Draft; R2-1811772_NOSIB1 Content for ANR CGI Reporting, 3rd Generation Partnership Project (3GPP), Mobile Competence Centre; 650, Route Des Lucioles; F-06921 Sophia-Antipolis Cedex; France, vol. RAN WG2, No. Gothenburg, Sweden; Aug. 20, 2018-Aug. 24, 2018, Aug. 10, 2018 (Aug. 10, 2018), 2 Pages.

* cited by examiner

CELL RESELECTION PROCEDURE FOR FREQUENCIES WITHOUT CELL-DEFINING SYNCHRONIZATION SIGNAL BLOCKS

FIELD OF THE DISCLOSURE

Aspects of the present disclosure generally relate to wireless communication, and more particularly to techniques and apparatuses for a cell reselection procedure for frequencies without cell-defining synchronization signal blocks.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a master information block (MIB) that includes an indication that there is no cell-defining synchronization signal block (SSB) on a frequency on which the UE is camped; and deprioritizing a reselection procedure for one or more cells on the frequency based at least in part on the indication that there is no cell-defining SSB on the frequency.

In some aspects, a UE for wireless communication may include memory and one or more processors operatively coupled to the memory. The memory and the one or more processors may be configured to receive a master information block (MIB) that includes an indication that there is no cell-defining synchronization signal block (SSB) on a frequency on which the UE is camped; and deprioritize a reselection procedure for one or more cells on the frequency based at least in part on the indication that there is no cell-defining SSB on the frequency.

In some aspects, a non-transitory computer-readable medium may store one or more instructions for wireless communication. The one or more instructions, when executed by one or more processors of a UE, may cause the one or more processors to receive a master information block (MIB) that includes an indication that there is no cell-defining synchronization signal block (SSB) on a frequency on which the UE is camped; and deprioritize a reselection procedure for one or more cells on the frequency based at least in part on the indication that there is no cell-defining SSB on the frequency.

In some aspects, an apparatus for wireless communication may include means for receiving a master information block (MIB) that includes an indication that there is no cell-defining synchronization signal block (SSB) on a frequency on which the UE is camped; and means for deprioritizing a reselection procedure for one or more cells on the frequency based at least in part on the indication that there is no cell-defining SSB on the frequency.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
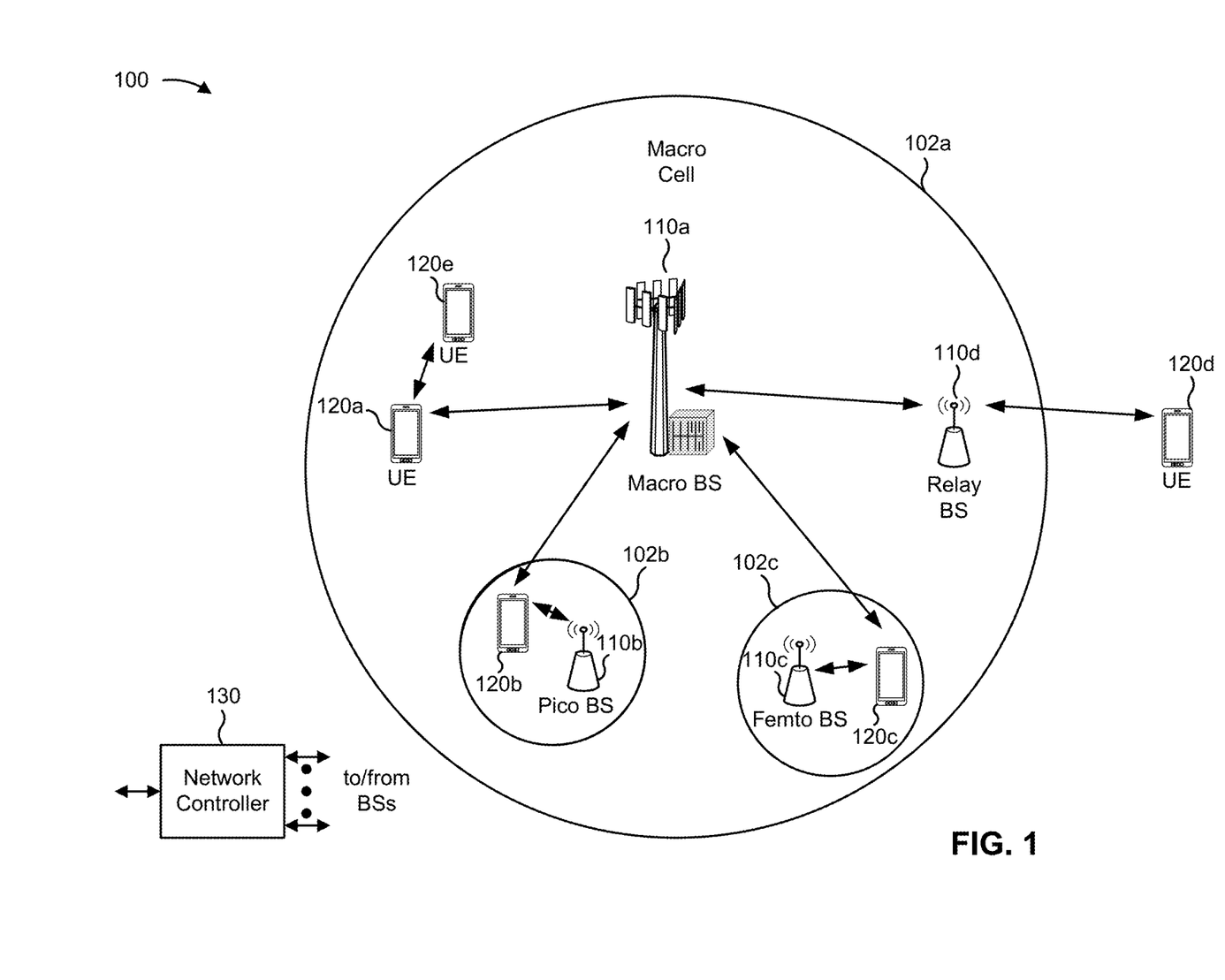
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
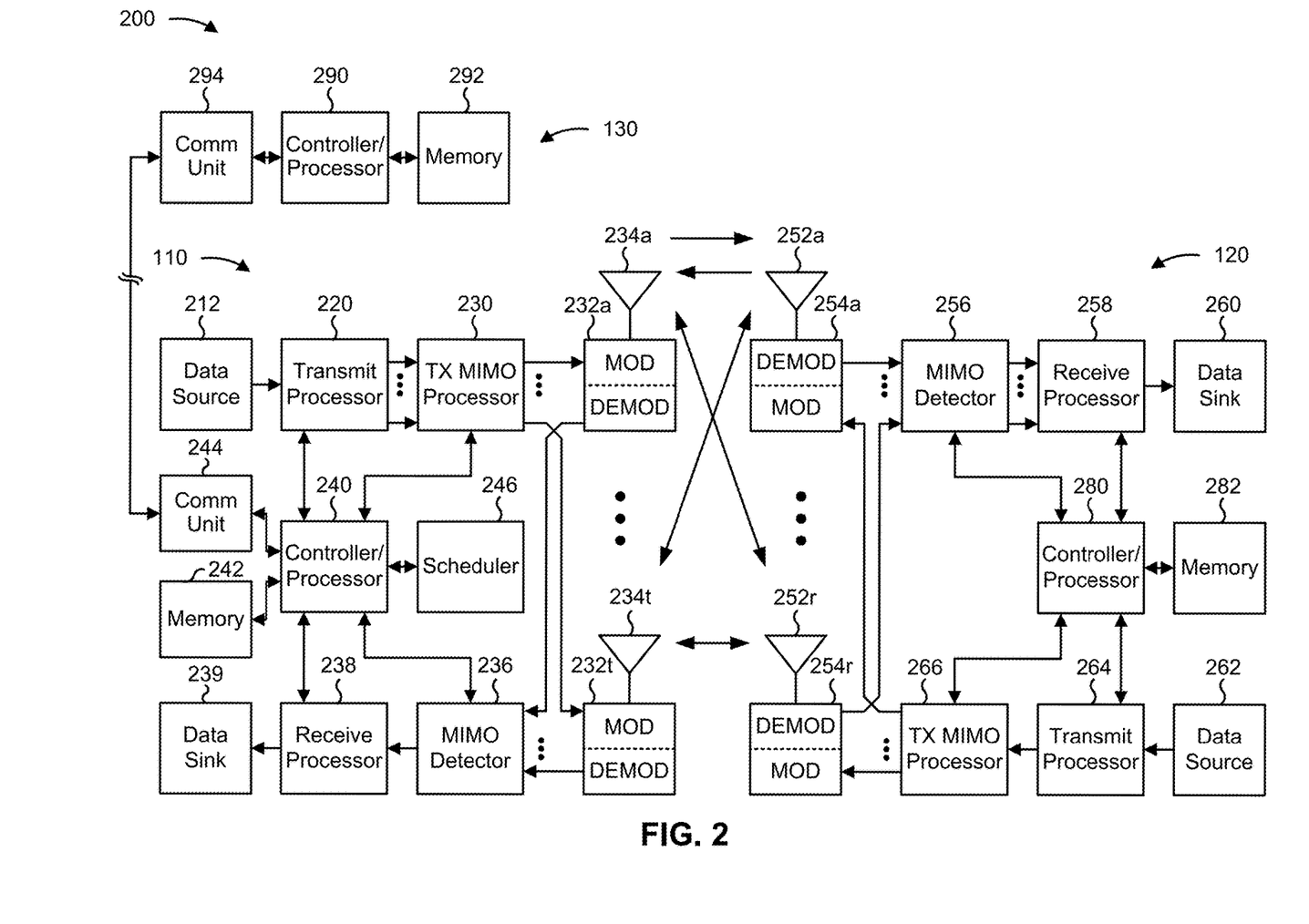
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a cell reselection procedure for frequencies without cell-defining synchronization signal blocks, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a master information block (MIB) that includes an indication that there is no cell-defining synchronization signal block (SSB) on a frequency on which the UE is camped; means for deprioritizing a reselection procedure for one or more cells on the frequency based at least in part on the indication that there is no cell-defining SSB on the frequency; and/or the like. In some aspects, such means may include one or more components of UE 120 described in connection with FIG. 2.

As indicated above, FIG. 2 is provided merely as an example. Other examples may differ from what is described with regard to FIG. 2.

Figure 3A:
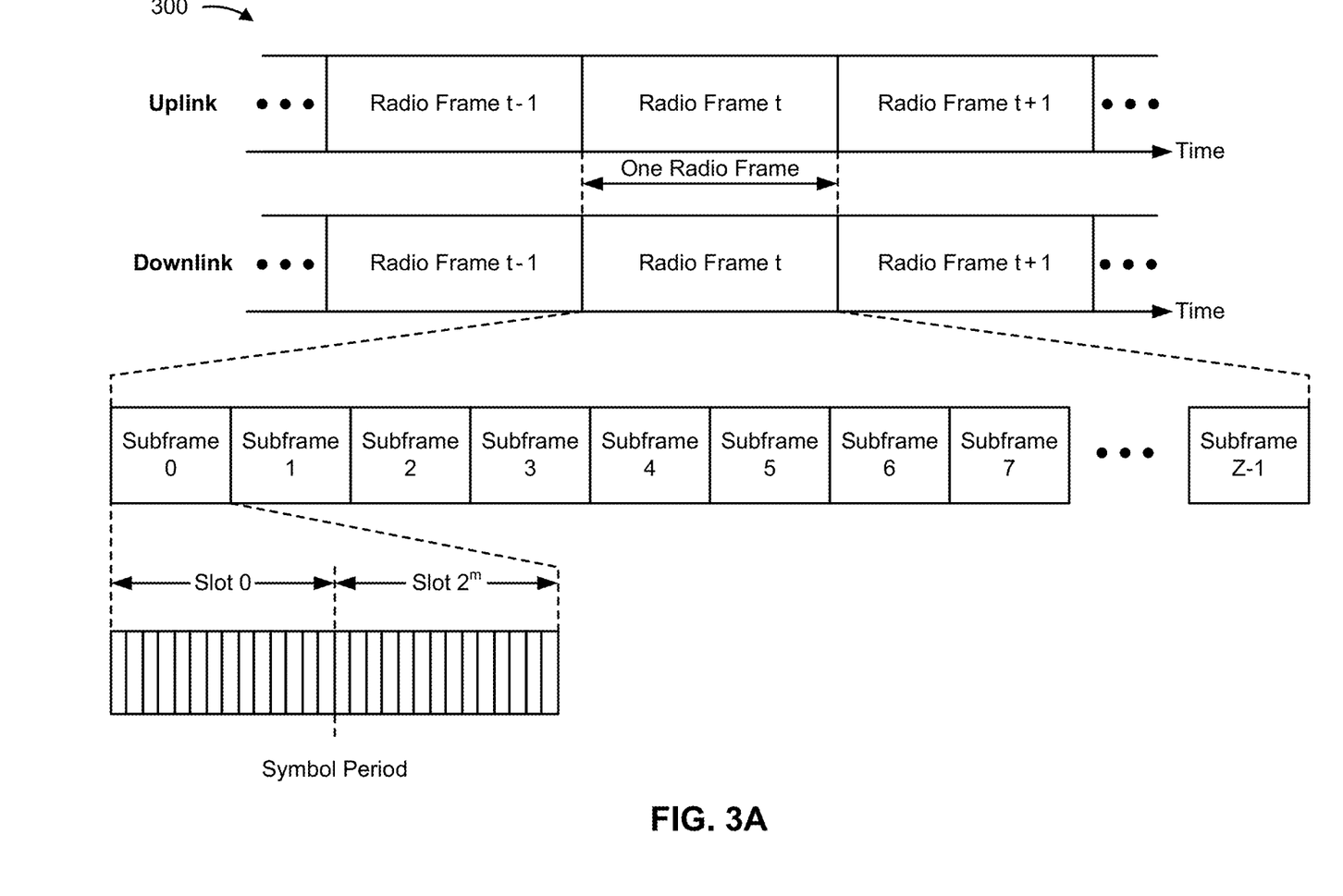
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures or transmission time intervals, which may be referred to using terms other than "frame," "subframe," "slot," "mini-slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
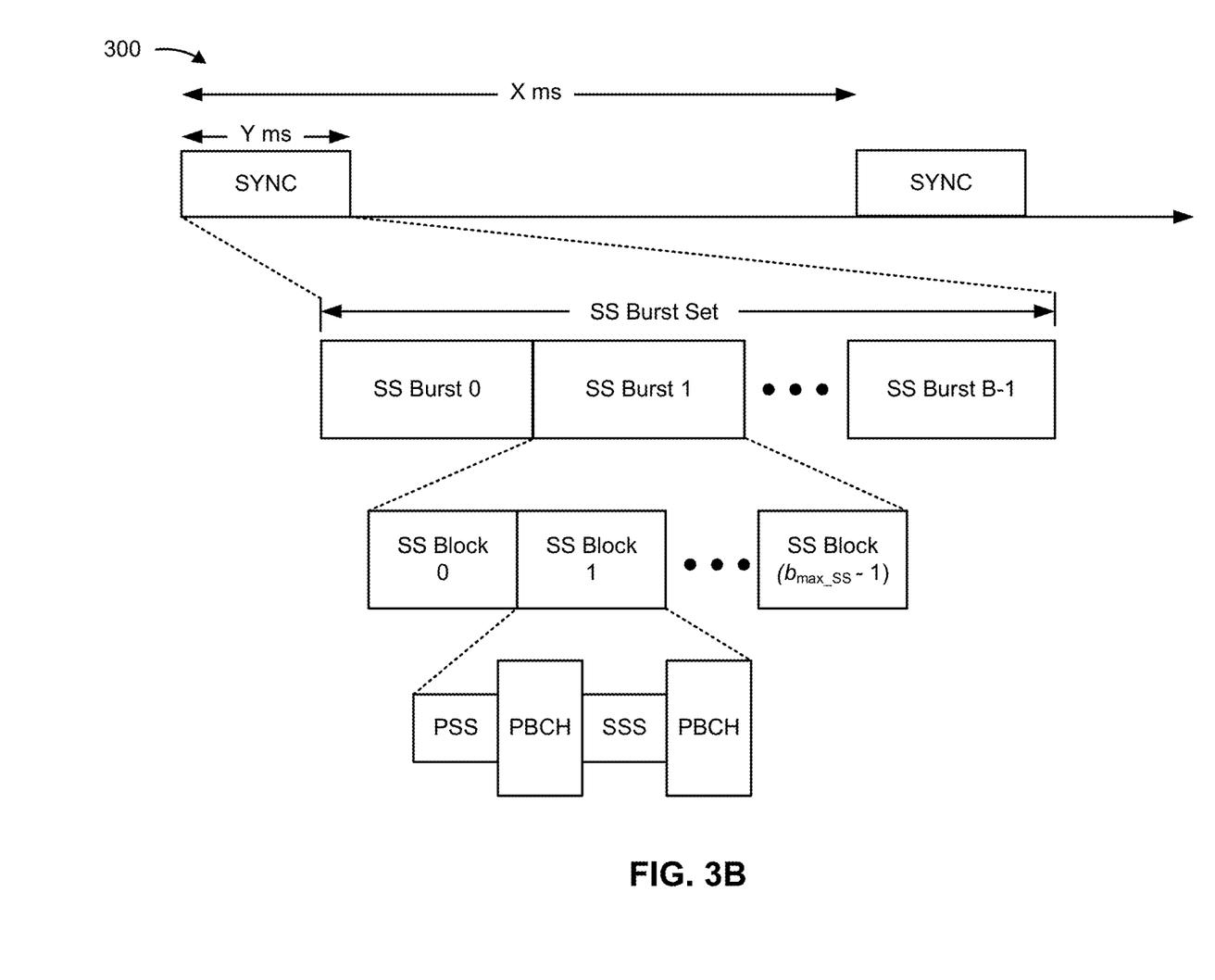
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B. An SS block (SSB) may also be referred to as a SS/PBCH block, in some aspects.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
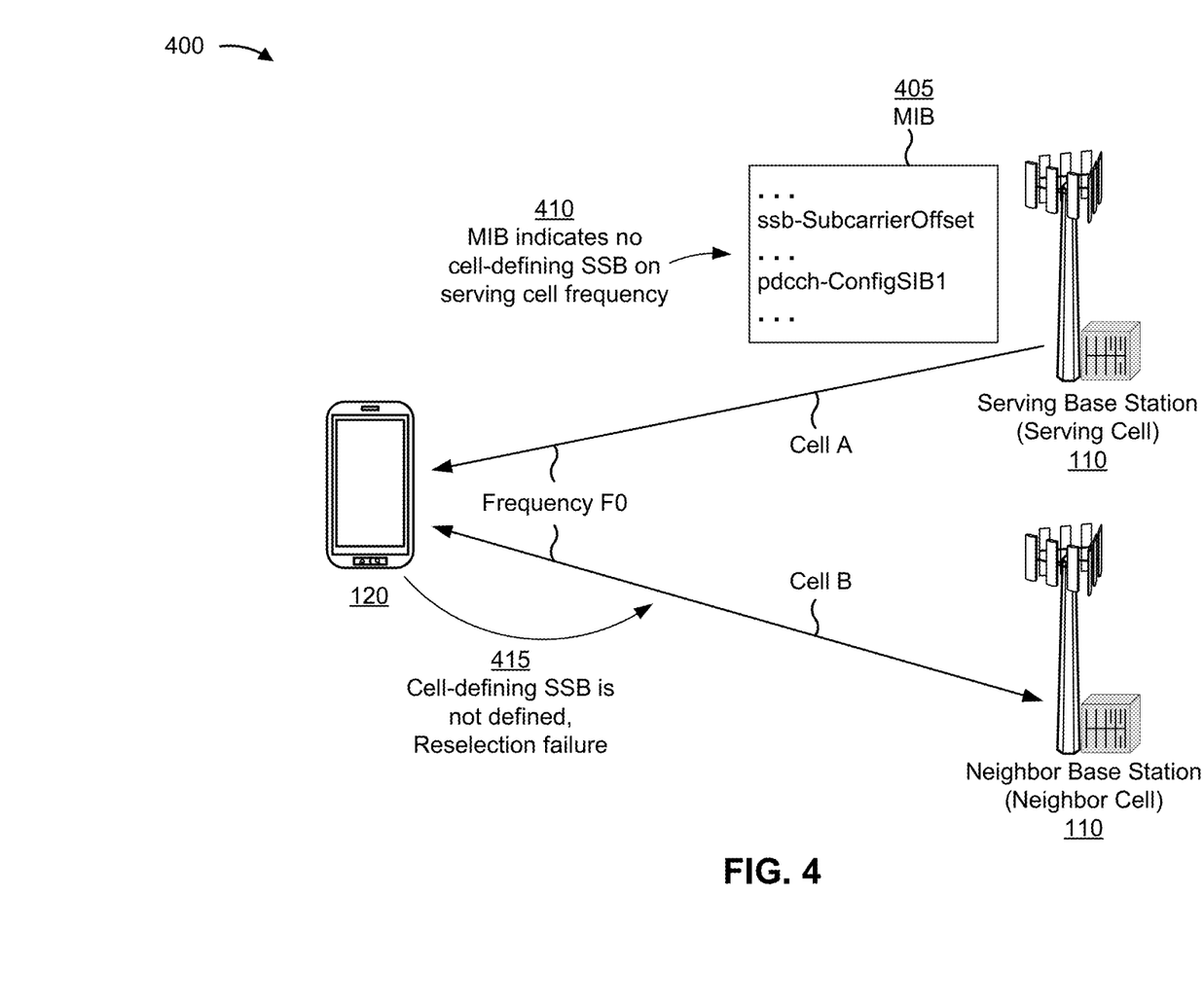
FIG. 4 is a diagram illustrating an example of a cell reselection procedure, in accordance with various aspects of the present disclosure.

FIG. 4 is a diagram illustrating an example 400 of a cell reselection procedure, in accordance with various aspects of the present disclosure.

As shown in FIG. 4, a serving base station 110 and a UE 120 may communicate with one another on a serving cell (shown as Cell A) that uses a specific frequency (shown as F0). For example, the UE 120 may be camped on the serving cell using the specific frequency. The frequency may be, for example, a center frequency associated with the serving cell. In some aspects, the serving cell may be referred to as a source cell in the context of cell reselection.

As shown by reference number 405, the serving base station 110 may transmit, and the UE 120 may receive, a master information block (MIB). In some aspects, the MIB may indicate a cell-defining SSB for a frequency, such as a frequency of the serving cell. In some aspects, the frequency may also be used by a neighbor cell, which may be referred to as a target cell in the context of cell reselection. A cell-defining SSB may refer to an SSB that includes system information block 1 (SIB1). The contents of SIB1 may include, for example, a cell identifier (cell ID) of a cell, a bandwidth for a PDCCH and/or a SIB of the cell, a control resource set (CORESET) of the cell (e.g., a common CORESET), a search space for the cell (e.g., a common search space), one or more PDCCH parameters for the cell, and/or the like. In some aspects, the contents of SIB1 for a cell may be used to perform cell reselection to that cell.

However, as shown by reference number 410, in some cases, the MIB may indicate that there is no cell-defining SSB for the frequency (e.g., the raster frequency, the serving cell frequency, and/or the like) on which the UE 120 is camped. For example, a first information element (IE) in the MIB, which may be referred to as an SSB subcarrier offset IE (shown as ssb-SubcarrierOffset), may indicate a location of a cell-defining SSB for the frequency, or may indicate that a cell-defining SSB is not present for the frequency. When a cell-defining SSB is present for the frequency, the SSB subcarrier offset IE may be set to a first value (e.g., from a range of values) that indicates a frequency domain offset (e.g., in units of number of subcarriers) between the cell-defining SSB and the overall resource block grid. When a cell-defining SSB is absent for the frequency, the SSB subcarrier offset IE may be set to a second value that indicates that there is no cell-defining SSB for the cell (e.g., for the frequency). This may indicate that SIB1 is not transmitted for the cell, and/or that there is no common CORESET for the cell.

A second IE in the MIB, which may be referred to as a PDCCH configuration SIB1 IE (shown as pdcch-ConfigSIB1), may include SIB1 contents for the cell when a cell-defining SSB is present for the cell. When a cell-defining SIB is not present for the frequency of the cell, the PDCCH configuration SIB1 IE may indicate a different frequency location that includes a cell-defining SSB, or may indicate a frequency range for which a cell-defining SSB is not present.

As shown by reference number 415, when the UE 120 performs a cell reselection procedure for a neighbor cell (shown as Cell B) having the same frequency (shown as frequency F0) as the serving cell, cell reselection may fail. For example, cell reselection may fail because a cell-defining SSB is not present for the frequency. Thus, the UE 120 will be unable to obtain SIB1 contents and/or other information, indicated by and/or included in a cell-defining SSB, that is necessary to perform cell reselection. As a result, the UE 120 may waste UE resources (e.g., battery power, memory, processing power, and/or the like) by performing measurements for the neighbor cell (e.g., to determine whether the neighbor cell is suitable for reselection) and/or by performing a cell reselection procedure, to attempt to reselect to the neighbor cell, which will ultimately fail. Furthermore, this may lead to delays in performing cell reselection due to time wasted attempting to perform a reselection that will ultimately fail, thereby increasing latency, reducing performance, and/or the like. Some techniques and apparatuses described herein conserve UE resources and/or reduce cell reselection latency by deprioritizing a cell reselection procedure for one or more cells for which a cell-defining SSB is not present. Additional details are described below.

As indicated above, FIG. 4 is provided as an example. Other examples may differ from what is described with respect to FIG. 4.

Figure 5:
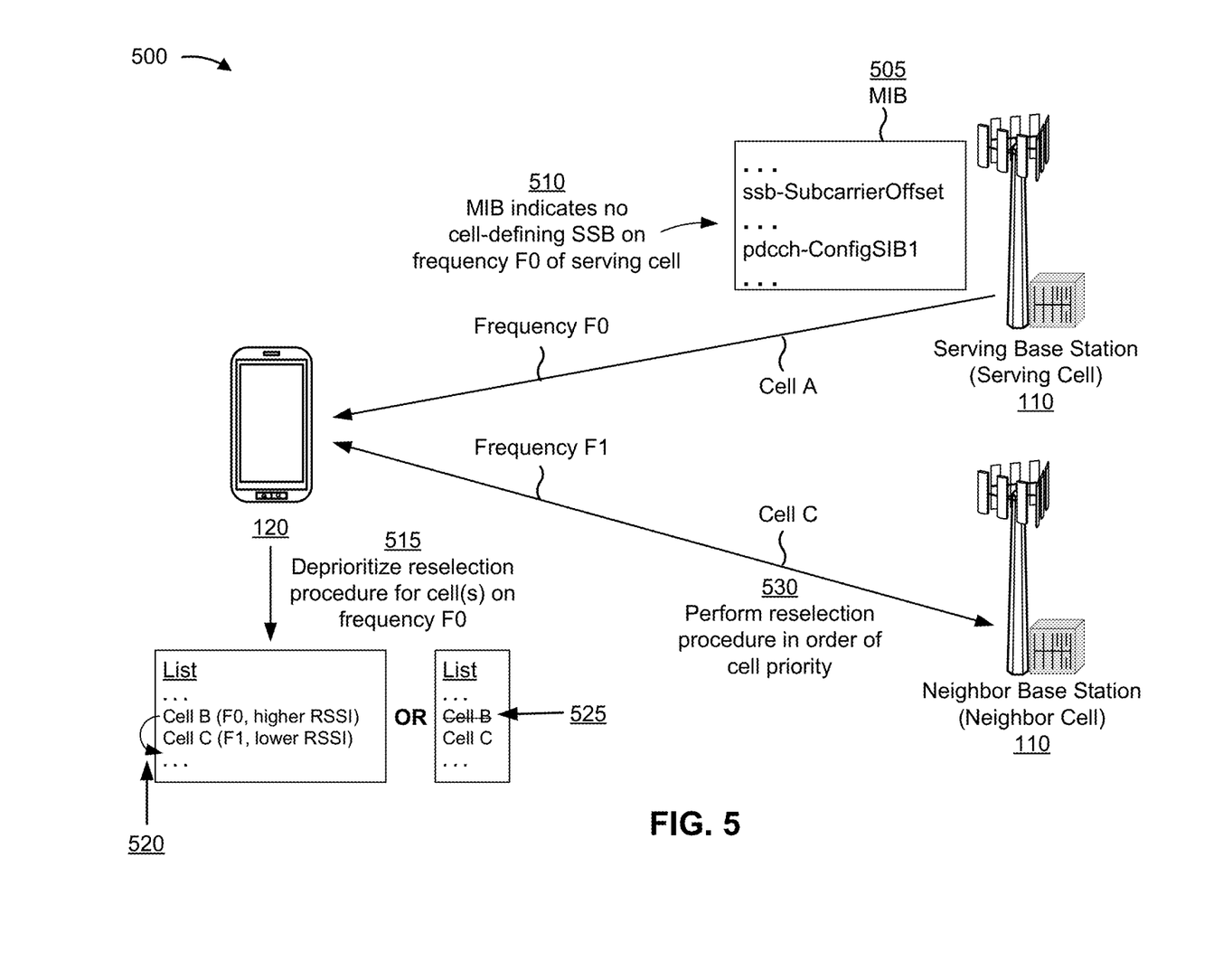
FIG. 5 is a diagram illustrating an example of a cell reselection procedure for frequencies without cell-defining synchronization signal blocks, in accordance with various aspects of the present disclosure.

FIG. 5 is a diagram illustrating an example 500 of a cell reselection procedure for frequencies without cell-defining synchronization signal blocks, in accordance with various aspects of the present disclosure.

As shown in FIG. 5, a serving base station 110 and a UE 120 may communicate with one another on a serving cell (shown as Cell A) having a first frequency (shown as F0). For example, the UE 120 may be camped on the serving cell having the first frequency. The first frequency may be, for example, a center frequency of the serving cell.

As shown by reference number 505, the serving base station 110 may transmit, and the UE 120 may receive, a MIB, as described above in connection with FIG. 4.

As shown by reference number 510, in some aspects, the MIB may include an indication that there is no cell-defining SSB for the first frequency on which the UE 120 is camped. For example, the SSB subcarrier offset IE (shown as ssb-SubcarrierOffset) may indicate that a cell-defining SSB is not present for the frequency. In this case, a value of the PDCCH configuration SIB1 IE (shown as pdcch-ConfigSIB1) may indicate a frequency location that includes a cell-defining SSB (e.g., using a pointer to the frequency location, by indicating an offset to the frequency location, and/or the like). Alternatively, a value of the PDCCH configuration SIB1 IE may indicate a frequency range for which a cell-defining SSB is not present. Alternatively, a value of the PDCCH configuration SIB1 IE may not indicate any frequencies (e.g., may not indicate a frequency location where a cell-defining SSB is present, and may not indicate a range of frequencies for which a cell-defining SSB is not present).

As shown by reference number 515, based at least in part on receiving the indication that there is no cell-defining SSB for the first frequency, the UE 120 may deprioritize a cell reselection procedure for one or more cells (e.g., one or more neighbor cells) of the first frequency. The UE 120 may use various techniques and/or a combination of techniques to deprioritize the cell reselection procedure for the cell(s) on the first frequency. For example, the UE 120 may assign a lower priority, for the cell reselection procedure, to a cell on the first frequency than a priority that would otherwise be assigned to the cell if the MIB were to indicate that a cell-defining SSB is present on the first frequency.

In some aspects, such deprioritization may result in, for example, the cell having a lower priority position on a prioritized list (e.g., a measurement list, a cell reselection list, a measurement and reselection list, and/or the like), removal of the cell from the list (e.g., removal of a cell identifier of the cell, a frequency identifier or the cell, and/or the like, from the list), and/or the like. In some aspects, the list may identify cells in order of priority for the UE 120 to measure the cells, perform a reselection procedure for the cells, and/or the like. In some aspects, cells on the list may be referred to as candidate cells because the cells are candidates for cell reselection.

For example, as shown by reference number 520, the UE 120 may deprioritize a cell on the first frequency (shown as Cell B) by assigning a lower priority to the cell than a candidate cell (shown as Cell B) on a second frequency (e.g., shown as frequency F1, for which a cell-defining SSB may be present). In this case, Cell B is assigned a lower priority than Cell C even though Cell B has a better signal quality parameter (e.g., received signal strength indicator (RSSI) parameter, reference signal received power (RSRP) parameter, reference signal received quality (RSRQ) parameter, signal to interference plus noise ratio (SINR) parameter, and/or the like) than Cell C. Thus, if a cell-defining SSB were present for the first frequency of Cell B, then Cell B would have been assigned a higher priority than Cell C. However, because a cell-defining SSB is absent for the first frequency, Cell B is assigned a lower priority than Cell C (e.g., shown as an arrow indicating deprioritization of Cell B below Cell C).

In some aspects, the UE 120 may assign a lower priority to the cell on the first frequency than to one or more candidate cells on frequencies other than the first frequency (e.g., cells on a second frequency, a third frequency, and so on). Additionally, or alternatively, the UE 120 may assign a lower priority to the cell on the first frequency than to all candidate cells on frequencies other than the first frequency. Additionally, or alternatively, the UE 120 may assign a lower priority to the cell on the first frequency than to one or more candidate cells (e.g., all candidate cells) on one or more frequencies, other than the first frequency, for which a cell-defining SSB is present. As a result, the UE 120 may perform a cell reselection procedure for the deprioritized cell(s) (e.g., Cell B and/or one or more other neighbor cells on the first frequency) only after a cell reselection procedure has failed for each of the candidate cells that have a higher priority than the deprioritized cell(s). In this way, the UE 120 may conserve UE resources and/or reduce reselection latency by performing cell reselection for a cell for which a cell-defining SSB is not present only after attempting cell reselection for other cells. In some aspects, performing cell reselection for a cell may include obtaining one or more measurements for the cell, attempting cell reselection when those measurements indicate that the cell satisfies a reselection criteria, and/or the like.

As another example, and as shown by reference number 525, the UE 120 may deprioritize a cell on the first frequency (shown as Cell B) by removing the cell (e.g., a cell identifier of the cell, a frequency identifier of the cell, and/or the like) from the list. For example, the UE 120 may remove Cell B from the list, as shown. As a result, the UE 120 may refrain from performing a cell reselection procedure for the cell(s) (e.g., Cell B and/or one or more other neighbor cells on the first frequency) that are removed from the list. In this way, the UE 120 may conserve UE resources and/or reduce reselection latency by refraining from performing cell reselection for a cell for which a cell-defining SSB is not present. In some aspects, refraining from performing cell reselection for a cell may include refraining from obtaining one or more measurements for the cell, refraining from attempting cell reselection despite measurements indicating that the cell satisfies a reselection criteria, and/or the like.

In some aspects, the UE 120 may determine a technique to be applied to deprioritize one or more cells on the first frequency based at least in part on information included in the MIB (e.g., in a PDCCH configuration SIB1 IE and/or the like). For example, the UE 120 may determine a technique (e.g., assigning a lower reselection priority or refraining from performing reselection) based at least in part on whether the MIB indicates a frequency location that includes a cell-defining SSB, whether the MIB indicates a frequency range for which a cell-defining SSB is not present, whether the MIB does not indicate either of the frequency location or the frequency range, and/or the like.

For example, if the MIB does not indicate a frequency location that includes a cell-defining SSB, then the UE 120 may refrain from performing reselection for the cell(s) on the first frequency. In this case, the UE 120 may not be able to obtain the cell-defining SSB for the cell(s) on the first frequency, and so may refrain from performing cell reselection for cell(s) on the first frequency. In this way, UE resources may be conserved that would otherwise be wasted attempting to perform cell reselection for the cell(s) on the first frequency.

As another example, if the MIB indicates a frequency location that includes a cell-defining SSB, then the UE 120 may perform a cell reselection procedure for the cell(s) on the first frequency only after a cell reselection procedure has failed for higher priority cell(s) (e.g., not on the first frequency). In this case, the UE 120 may be able to obtain the cell-defining SSB for the cell(s) on the first frequency after a delay (e.g., after scanning another frequency indicated by the MIB), and so may still perform cell reselection for cells on the first frequency, but only after cell reselection has been attempted and failed for other frequencies. In this way, UE resources needed to scan another frequency for the cell-defining SSB may be conserved (e.g., in the case where the UE 120 reselects to a different cell prior to attempting cell reselection for the cell(s) on the first frequency), cell reselection latency may be reduced, and/or the like.

In some aspects, if the MIB indicates a range of frequencies for which a cell-defining SSB is not present, then the UE 120 may refrain from performing reselection for the cell(s) on the first frequency. In this case, the UE 120 may conserve UE resources that would otherwise be wasted scanning for a cell-defining SSB, even though the UE 120 could scan in a narrower range than if the MIB did not indicate the range of frequencies. Alternatively, if the MIB indicates a range of frequencies for which a cell-defining SSB is not present, then the UE 120 may perform a cell reselection procedure for the cell(s) on the first frequency only after a cell reselection procedure has failed for higher priority cell(s) (e.g., not on the first frequency). In this case, the UE 120 may be able to successfully perform cell reselection by scanning a narrower range of frequencies than if the MIB did not indicate the range of frequencies.

In some aspects, if the MIB indicates a range of frequencies for which a cell-defining SSB is not present, then the UE 120 may refrain from performing reselection for the cell(s) on the range of frequencies. Alternatively, if the MIB indicates a range of frequencies for which a cell-defining SSB is not present, then the UE 120 may perform a cell reselection procedure for the cell(s) in the range of frequencies only after a cell reselection procedure has failed for higher priority cell(s) (e.g., not in the range of frequencies). In this way, the UE 120 may conserve UE resources, may reduce cell reselection latency, may improve performance, and/or the like.

In some aspects, the UE 120 may determine a technique to be applied to deprioritize one or more cells on the first frequency based at least in part on an indicated size of the range of frequencies that does include a cell-defining SSB. For example, for a range with a small size, the UE 120 may refrain from performing reselection for the cell(s) on the first frequency because the UE 120 would waste UE resources scanning a larger range for a cell-defining SSB. Conversely, for a range with a large size, the UE 120 may perform a cell reselection procedure for the cell(s) on the first frequency only after a cell reselection procedure has failed for higher priority cell(s) (e.g., not on the first frequency) because the UE 120 would not waste as many UE resources scanning a smaller range for a cell-defining SSB. In this way, the UE 120 may balance the likelihood of performing successful cell reselection with the amount of UE resources required to perform such cell reselection.

As shown by reference number 530, the UE 120 may perform a cell reselection procedure in order of cell priority. As indicated above, in some aspects, the UE 120 may perform a cell reselection procedure for the cell(s) on the first frequency only after a cell reselection procedure has failed for higher priority cell(s) (e.g., not on the first frequency). For example, if cell reselection fails for Cell C, the UE 120 may then attempt cell reselection to Cell B. Alternatively, the UE 120 may refrain from performing cell reselection for the cell(s) on the first frequency. In this case, the UE 120 may refrain from performing cell reselection to Cell B even if cell reselection fails for all other cells.

By deprioritizing a cell reselection procedure for one or more cells for which a cell-defining SSB is not present (e.g., by assigning a lower priority to the one or more cells, by refraining from performing cell reselection for the one or more cells, and/or the like), the UE 120 may conserve UE resources, may reduce cell reselection latency, may improve performance, and/or the like.

As indicated above, FIG. 5 is provided as an example. Other examples may differ from what is described with respect to FIG. 5.

Figure 6:
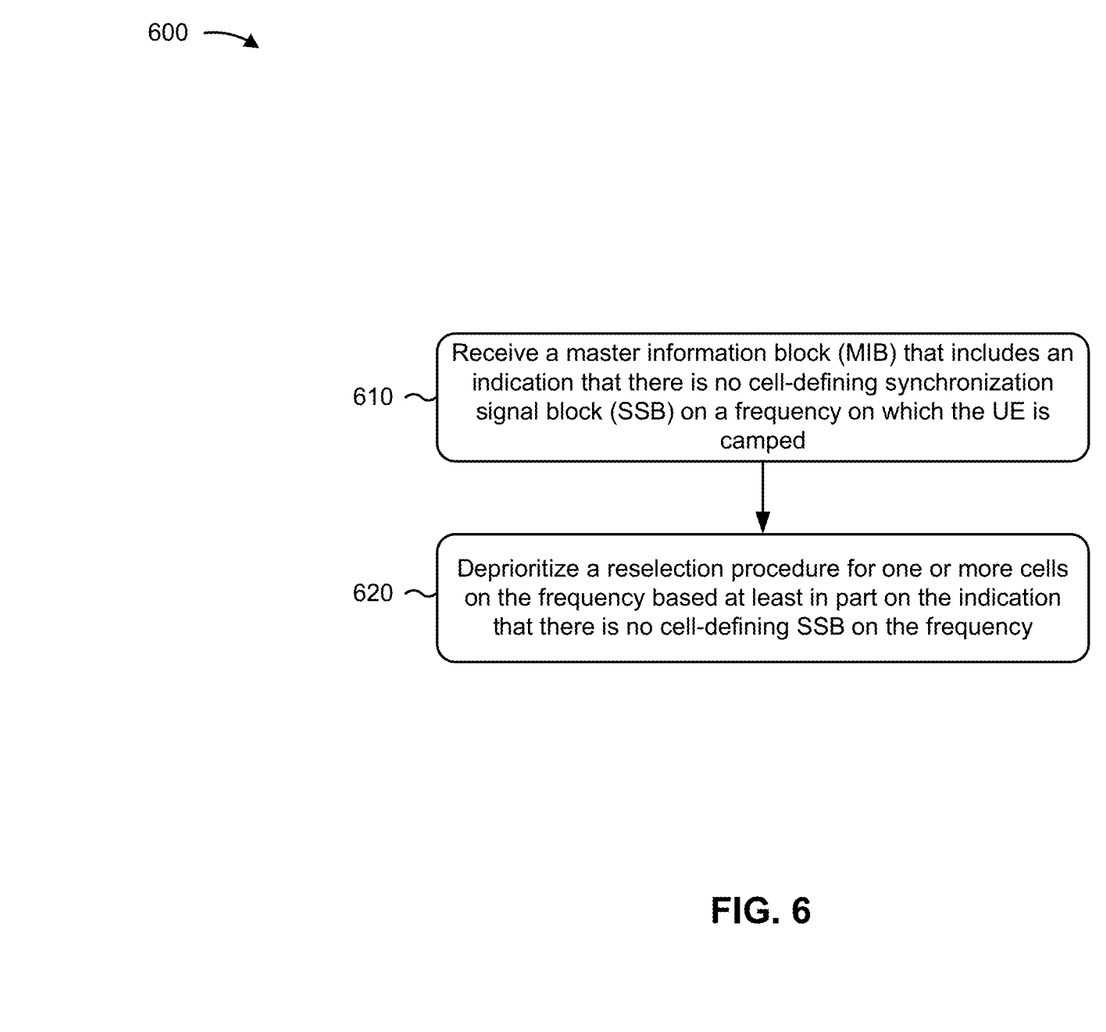
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120 and/or the like) performs operations relating to a cell reselection procedure for frequencies without cell-defining synchronization signal blocks.

As shown in FIG. 6, in some aspects, process 600 may include receiving a master information block (MIB) that includes an indication that there is no cell-defining synchronization signal block (SSB) on a frequency on which the UE is camped (block 610). For example, the UE (e.g., using antenna 252, DEMOD 254, MIMO detector 256, receive processor 258, controller/processor 280, memory 282, and/or the like) may receive a MIB that includes an indication that there is no cell-defining SSB on a frequency on which the UE is camped, as described above.

As further shown in FIG. 6, in some aspects, process 600 may include deprioritizing a reselection procedure for one or more cells on the frequency based at least in part on the indication that there is no cell-defining SSB on the frequency (block 620). For example, the UE (e.g., using controller/processor 280, memory 282, and/or the like) may deprioritize a reselection procedure for one or more cells on the frequency based at least in part on the indication that there is no cell-defining SSB on the frequency, as described above.

Process 600 may include additional aspects, such as any single aspect and/or any combination of aspects described below and/or in connection with one or more other processes described elsewhere herein.

In some aspects, deprioritizing the reselection procedure for the one or more cells comprises assigning a lower priority to the one or more cells for the reselection procedure than a priority that would be assigned if the MIB were to indicate presence of a cell-defining SSB on the frequency. In some aspects, deprioritizing the reselection procedure for the one or more cells comprises performing the reselection procedure for the one or more cells after the reselection procedure has failed for one or more candidate cells on frequencies for which a cell-defining SSB is present. In some aspects, deprioritizing the reselection procedure for the one or more cells comprises refraining from performing the reselection procedure for the one or more cells.

In some aspects, the MIB does not indicate a frequency location that includes a cell-defining SSB. In some aspects, deprioritizing the reselection procedure for the one or more cells comprises refraining from performing the reselection procedure for the one or more cells based at least in part on a determination that the MIB does not indicate a frequency location that includes a cell-defining SSB.

In some aspects, the MIB indicates a frequency location that includes a cell-defining SSB. In some aspects, deprioritizing the one or more cells comprises performing the reselection procedure for the one or more cells after the reselection procedure has failed for one or more candidate cells on frequencies for which a cell-defining SSB is present based at least in part on a determination that the MIB indicates a frequency location that includes a cell-defining SSB.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a master information block (MIB) that includes an indication that there is no cell-defining synchronization signal block (SSB) on a frequency on which the UE is camped;
   assigning a lower priority to a reselection procedure for one or more cells on the frequency than for one or more candidate cells on frequencies for which a cell-defining SSB is present based at least in part on the indication that there is no cell-defining SSB on the frequency; and
   performing, based on the lower priority, the reselection procedure for the one or more cells only after the reselection procedure has failed for each of the one or more candidate cells on frequencies for which the cell-defining SSB is present.

2. The method of claim 1, wherein assigning the lower priority comprises assigning theft lower priority to the one or more cells for the reselection procedure than a priority that would be assigned if the MIB were to indicate presence of a cell-defining SSB on the frequency.

3. The method of claim 1, further comprising:
   receiving another MIB that includes an indication that there is no cell-defining SSB on another frequency on which the UE is camped,
   wherein the other MIB does not indicate a frequency location that includes a cell-defining SSB.

4. The method of claim 3, further comprising:
   refraining from performing the reselection procedure for a cell on the other frequency based at least in part on a determination that the other MIB does not indicate a frequency location that includes a cell-defining SSB.

5. The method of claim 1, wherein the MIB indicates a frequency location that includes a cell-defining SSB.

6. The method of claim 5, wherein performing the reselection procedure for the one or more cells comprises performing the reselection procedure for the one or more cells after the reselection procedure has failed for the one or more candidate cells on frequencies for which the cell-defining SSB is present based at least in part on a determination that the MIB indicates a frequency location that includes a cell-defining SSB.

7. The method of claim 1, wherein the reselection procedure for the one or more cells includes obtaining one or more measurements for the one or more cells and attempting cell reselection when the one or more measurements indicate a reselection criteria is satisfied.

8. The method of claim 1, wherein the one or more cells have a better signal quality parameter than the one or more candidate cells on frequencies for which the cell-defining SSB is present.

9. A user equipment (UE) for wireless communication, comprising:
   a memory; and
   one or more processors coupled to the memory, the memory and the one or more processors configured to:
      receive a master information block (MIB) that includes an indication that there is no cell-defining synchronization signal block (SSB) on a frequency on which the UE is camped;
      assign a lower priority to a reselection procedure for one or more cells on the frequency than for one or more candidate cells on frequencies for which a cell-defining SSB is present based at least in part on the indication that there is no cell-defining SSB on the frequency; and
      perform, based on the lower priority, the reselection procedure for the one or more cells only after the reselection procedure has failed for each of the one or more candidate cells on frequencies for which the cell-defining SSB is present.

10. The UE of claim 9, wherein the one or more processors, when assigning the lower priority, are configured to assign the lower priority to the one or more cells for the reselection procedure than a priority that would be assigned if the MIB were to indicate presence of a cell-defining SSB on the frequency.

11. The UE of claim 9, wherein the one or more processors are configured to:

receive another MIB that includes an indication that there is no cell-defining SSB on another frequency on which the UE is camped,
   wherein the other MIB does not indicate a frequency location that includes a cell-defining SSB.

12. The UE of claim 11, wherein the one or more processors are configured to:
   refrain from performing the reselection procedure for a cell on the other frequency based at least in part on a determination that the other MIB does not indicate a frequency location that includes a cell-defining SSB.

13. The UE of claim 9, wherein the MIB indicates a frequency location that includes a cell-defining SSB.

14. The UE of claim 13, wherein the one or more processors, when performing the reselection procedure for the one or more cells, are configured to perform the reselection procedure for the one or more cells after the reselection procedure has failed for the one or more candidate cells on frequencies for which the cell-defining SSB is present based at least in part on a determination that the MIB indicates a frequency location that includes a cell-defining SSB.

15. The UE of claim 9, wherein the reselection procedure for the one or more cells includes obtaining one or more measurements for the one or more cells and attempting cell reselection when the one or more measurements indicate a reselection criteria is satisfied.

16. The UE of claim 9, wherein the one or more cells have a better signal quality parameter than the one or more candidate cells on frequencies for which the cell-defining SSB is present.

17. A non-transitory computer-readable medium storing one or more instructions for wireless communication, the one or more instructions comprising:
   one or more instructions that, when executed by one or more processors of a user equipment (UE), cause the one or more processors to:
      receive a master information block (MIB) that includes an indication that there is no cell-defining synchronization signal block (SSB) on a frequency on which the UE is camped;
      assign a lower priority to a reselection procedure for one or more cells on the frequency than for one or more candidate cells on frequencies for which a cell-defining SSB is present based at least in part on the indication that there is no cell-defining SSB on the frequency; and
      perform, based on the lower priority, the reselection procedure for the one or more cells only after the reselection procedure has failed for each of the one or more candidate cells on frequencies for which the cell-defining SSB is present.

18. The non-transitory computer-readable medium of claim 17, wherein the one or more instructions, that cause the one or more processors to assign the lower priority, further cause the one or more processors to assign the lower priority to the one or more cells for the reselection procedure than a priority that would be assigned if the MIB were to indicate presence of a cell-defining SSB on the frequency.

19. The non-transitory computer-readable medium of claim 17, wherein the one or more instructions further cause the one or more processors to:
   receive another MIB that includes an indication that there is no cell-defining SSB on another frequency on which the UE is camped,
   wherein the other MIB does not indicate a frequency location that includes a cell-defining SSB.

20. The non-transitory computer-readable medium of claim 19, wherein the one or more instructions further cause the one or more processors to:
   refrain from performing the reselection procedure for a cell on the other frequency based at least in part on a determination that the other MIB does not indicate a frequency location that includes a cell-defining SSB.

21. The non-transitory computer-readable medium of claim 17, wherein the MIB indicates a frequency location that includes a cell-defining SSB.

22. The non-transitory computer-readable medium of claim 21, wherein the one or more instructions, that cause the one or more processors to perform the reselection procedure for the one or more cells, further cause the one or more processors to perform the reselection procedure for the one or more cells after the reselection procedure has failed for the one or more candidate cells on frequencies for which the cell-defining SSB is present based at least in part on a determination that the MIB indicates a frequency location that includes a cell-defining SSB.

23. The non-transitory computer-readable medium of claim 17, wherein the reselection procedure for the one or more cells includes obtaining one or more measurements for the one or more cells and attempting cell reselection when the one or more measurements indicate a reselection criteria is satisfied.

24. An apparatus for wireless communication, comprising:
   means for receiving a master information block (MIB) that includes an indication that there is no cell-defining synchronization signal block (SSB) on a frequency on which the apparatus is camped;
   means for assigning a lower priority to a reselection procedure for one or more cells on the frequency than for one or more candidate cells on frequencies for which a cell-defining SSB is present based at least in part on the indication that there is no cell-defining SSB on the frequency; and
   means for performing, based on the lower priority, the reselection procedure for the one or more cells only after the reselection procedure has failed for each of the one or more candidate cells on frequencies for which the cell-defining SSB is present.

25. The apparatus of claim 24, wherein the means for assigning the lower priority to the reselection procedure for the one or more cells comprises means for assigning the lower priority to the one or more cells for the reselection procedure than a priority that would be assigned if the MIB were to indicate presence of a cell-defining SSB on the frequency.

26. The apparatus of claim 24, further comprising:
   means for receiving another MIB that includes an indication that there is no cell-defining SSB on another frequency on which the apparatus is camped,
   wherein the other MIB does not indicate a frequency location that includes a cell-defining SSB.

27. The apparatus of claim 26, further comprising:
   means for refraining from performing the reselection procedure for a cell on the other frequency based at least in part on a determination that the other MIB does not indicate a frequency location that includes a cell-defining SSB.

28. The apparatus of claim 24, wherein the MIB indicates a frequency location that includes a cell-defining SSB.

29. The apparatus of claim 28, wherein the means for performing the reselection procedure for the one or more cells comprises means for performing the reselection procedure for the one or more cells after the reselection procedure has failed for the one or more candidate cells on frequencies for which the cell-defining SSB is present based at least in part on a determination that the MIB indicates a frequency location that includes a cell-defining SSB.

30. The apparatus of claim 24, wherein the reselection procedure for the one or more cells includes obtaining one or more measurements for the one or more cells and attempting cell reselection when the one or more measurements indicate a reselection criteria is satisfied.

* * * * *